(12) United States Patent
Shade (10) Patent No.: US 6,997,560 B2
(45) Date of Patent: Feb. 14, 2006

(54) MICROMIRROR DEVICE WITH ADJACENTLY DISPOSED SUPPORT REGION

(75) Inventor: Gary F. Shade, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 197 days.

(21) Appl. No.: 10/706,109

(22) Filed: Nov. 12, 2003

(65) Prior Publication Data

US 2005/0099697 A1 May 12, 2005

(51) Int. Cl.
G03B 21/00 (2006.01)
G03B 21/26 (2006.01)
G03B 21/14 (2006.01)
G03B 21/28 (2006.01)
H04N 9/31 (2006.01)

(52) U.S. Cl. ............................ 353/31; 353/34; 353/38; 353/81; 353/97; 353/99; 348/771; 348/755

(58) Field of Classification Search ................. 353/31, 353/33–34, 38, 81, 97–99; 348/771, 755; 345/5, 108

See application file for complete search history.

(56) References Cited

U.S. PATENT DOCUMENTS

| | | | |
|---|---|---|---|
| 4,733,252 A * | 3/1988 | Daniele et al. ............. 347/239 |
| 5,490,009 A | 2/1996 | Venkateswar et al. |
| 6,031,657 A * | 2/2000 | Robinson et al. ........... 359/293 |
| 6,089,719 A * | 7/2000 | Lin .............................. 353/33 |
| 6,406,148 B1 * | 6/2002 | Marshall et al. ............. 353/31 |
| 6,575,576 B1 * | 6/2003 | Ciacci et al. ................. 353/30 |
| 6,582,080 B1 * | 6/2003 | Gibbon et al. ............... 353/20 |
| 6,767,100 B1 * | 7/2004 | Long et al. ................... 353/31 |
| 2003/0094564 A1 | 5/2003 | Verdonk et al. |

* cited by examiner

Primary Examiner—W. B. Perkey
Assistant Examiner—Magda Cruz
(74) Attorney, Agent, or Firm—Carrie A. Boone, P.C.

(57) ABSTRACT

An optical system including two or more micromirror arrays is disclosed. The micromirror arrays include alternately disposed transparent and opaque surfaces. The system spatially separates an image toward the micromirror arrays, the image is reflected from the micromirrors, and the reflected image is combined into a composite image that can be displayed or projected. Control and support circuitry that is typically disposed beneath the transparent surfaces of the micromirror arrays can be disposed beneath the opaque surfaces.

20 Claims, 7 Drawing Sheets

MICROMIRROR DEVICE WITH ADJACENTLY DISPOSED SUPPORT REGION

FIELD OF THE INVENTION

This invention relates to optical display and projection systems, particularly micro-electro-mechanical (MEM) devices.

BACKGROUND OF THE INVENTION

Optical display and projection systems may use a variety of technologies to produce images. The micromirror device has emerged as the preferred technology of optical systems. Micromirrors are small individually addressable mirrors that reflect an image. Micromirrors produce superior image quality, are lightweight, and are compact. The terms "micromirror" and "micromirror device" are used herein to refer to any micromirror technology.

Micromirror devices include a two-dimensional plane of micromirrors, called a "micromirror array," juxtaposed in orderly rows and columns, such that an image can be reflected and/or projected. Liquid crystal on silicon (LCOS) and digital micromirror device (DMD) are two competing micromirror technologies.

LCOS and DMD devices differ in how they activate, or turn "on," and deactivate, or turn "off," the individual micromirrors. LCOS systems use an electrically created field to change the polarization of a liquid crystal material. The "on" and "off" states of the LCOS device depend on whether the liquid crystal is polarized or not. In a DMD device, the angle of each micromirror is changed in response to an electrical potential, producing the "on" and "off" events.

Although micromirror devices vary considerably, they are generally composed of several layers of miniaturized components. A micromirror array may include a transparent layer of glass or plastic, a liquid crystal layer (in LCOS devices), and an antireflective coating layer. A micromirror layer, including a multitude of micromirrors, is disposed such that the mirrored surfaces are oriented toward the top of the micromirror device. Each micromirror functions independently of each other micromirror. The underlying layer, or substrate, is generally composed of silicon.

A control and support region, which may be partially or completely embedded in the substrate, includes electrical circuitry for generating an electromagnetic or electrostatic field to individually control the micromirrors. Each micromirror includes a distinct control and support region, typically beneath the micromirror, which is independently operable. The components of the control and support region may vary in size and number. The small size of the micromirrors limits the available region for disposing the control and support components and, as a result, the control and support components tend to be quite small.

Since micromirror devices are used typically in high-priced systems, such as high-end computer monitors and televisions, image quality is of particular importance. The quality of the displayed or projected image depends on both the fill factor and image resolution of the display medium. For a micromirror array, fill factor refers to the percentage of the device that is occupied by micromirrors. (A similar term, fill ratio, describes the ratio of reflective areas to non-reflective areas of the micromirror array.) Thus, fill factor and fill ratio are characteristics that directly impact the quality of images produced by the micromirror array.

A device that reflects 100% of an image has a perfect fill factor. The micromirrors in prior art micromirror arrays are separated by gaps, which prevent short-circuiting between adjacent micromirrors. Since the portion of the image striking the gaps is not reflected, the reflected image is an incomplete manifestation of the original image. Because of the gaps, the fill factor of prior art micromirror devices is less than 100%. Thus, the gaps between the micromirrors impede the ability of designers to improve the image quality of micromirror devices.

In addition to the fill factor, the image resolution of micromirror devices is expected to be high. Image resolution refers to the level of detail in an image, and is measured in dots per inch (dpi) or pixels per area. Each micromirror in the micromirror array is a pixel, or picture element. Thus, an array with more micromirrors tends to have a higher image resolution.

To improve image resolution, the size of the individual micromirrors in a micromirror array may be reduced, since more of the smaller micromirrors can be disposed in the given surface area. Theoretically, the increase in the number of micromirrors improves the image resolution. As a practical matter, the size of the gaps cannot be reduced beyond a predetermined minimum size. However, as the number of micromirrors increases, the proportion of the gap spacing between micromirrors also increases, causing the fill factor to actually drop. The effort to increase the image resolution in this manner actually lowers the fill factor.

Thus, there is a continuing need for a micromirror device that improves both the image resolution and the fill factor of prior art micromirror devices.

DETAILED DESCRIPTION

In accordance with some embodiments described herein, an optical system is disclosed that spatially separates an image into at least two distinct images, which are then reflected by two or more complementary micromirror arrays. The distinct spatially separated images are focused upon the complementary micromirror arrays, reflected, and recombined into a composite image that can be displayed or projected. The composite image formed in this manner has a fill factor that is substantially close to 100%.

A ray-forming device separates the image into the at least two distinct images. The ray-forming device may be a beam splitter, a patterned beam splitter, a refractive optic, a birefringent crystal, a system of mirrors, a light-separating optical device, or a combination of these elements.

In optical physics, an image is an aggregation of light. Without light, there is no image. "Incident light" is used herein to refer to any light coming into or affecting the device. The "image source" is any source of light, whether it is incident light or that of an image. An "image component" is any component of light arising from the image source.

In the following detailed description, reference is made to the accompanying drawings, which show by way of illustration specific embodiments in which the invention may be practiced. However, it is to be understood that other embodiments will become apparent to those of ordinary skill in the art upon reading this disclosure. The following detailed description is, therefore, not to be construed in a limiting sense, as the scope of the present invention is defined by the claims.

As used herein, the "optical pathway" is the course traveled by the incident light, whether prior to entering the device, within the device, or leaving the device. The optical pathway expressly includes the course traveled by spatially separated light or image components.

Figure 1:
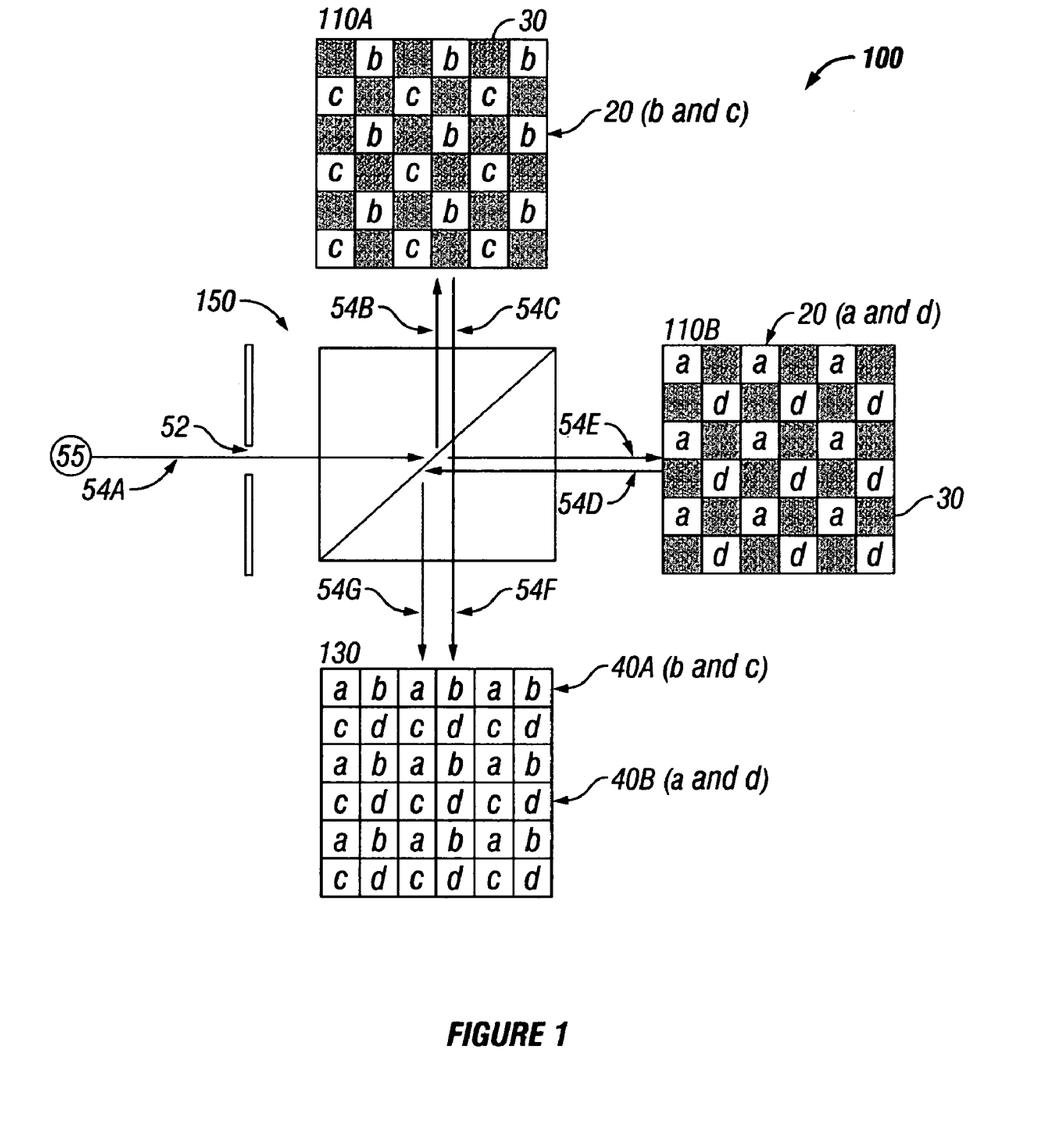
FIG. 1 is a top view of an optical system, according to some embodiments.

FIG. 1 shows an optical system 100, according to some embodiments. The optical system 100 includes a ray-forming device 150 and two micromirror arrays 110A and 110B (collectively, micromirror arrays 110). Image components 54A, 54B, 54C, 54D, 54E, 54F, and 54G (collectively, image components 54) follow an optical pathway from an image source 55, through the optical system 100, to produce a composite image 130 that is representative of the image source.

The representation of FIG. 1 is two-dimensional. In practice, the micro-mirrors 110 and the ray-forming device 150 would not lay flat, but would be positioned orthogonal to the incoming light source. Persons of ordinary skill in the art are familiar with this form of two-dimensional representation of a three-dimensional optical system.

Each micromirror array 110 is composed of alternately disposed micromirrors 20 and non-mirrored regions 30, forming a sort of checkerboard pattern. The micromirror arrays 110A and 110B are identical in size, forming a square array of micromirrors 20 and non-mirrored regions 30, in one embodiment. The micromirror array 110A is complementary to the micromirror array 110B, such that, where micromirrors 20 are disposed in the micromirror array 110A, non-mirrored regions 30 are disposed in the micromirror array 110B; likewise, where non-mirrored regions 30 are disposed in the micromirror array 110A, micromirrors 20 are disposed in the micromirror array 110B.

The composite image 130 includes image components 40A and 40B (collectively, image components 40). The micromirrors 20 of the micromirror arrays 110 are designated with the "a," "b, "c," and "d," to illustrate which micromirrors 110 produce which image components 40 in the composite image 130. Image components 40A ("b" and "c") are produced by the micromirror array 110A while image components 40B ("a" and "d") are produced by the micromirror array 110B.

The ray-forming device 150 of the optical system 100 may be a simple beam splitter. A beam splitter separates light by reflection, sending a portion of the image source in one direction, producing a first set of image components, and sending another portion of the image source in a different direction, producing a second set of image components. When the active surface of the ray-forming device is positioned at a forty-five degree angle relative to the image source, image components disposed at a ninety-degree angle relative to one another are produced.

In the optical system of FIG. 1, the ray-forming device 150 is disposed at an angle forty-five degrees from the image component 54A coming from the image source 55 through an aperture 52. The ray-forming device 150 separates the image component 54A into image components 54B and 54E. Image component 54B is reflected by the ray-forming device 150, at a ninety-degree angle from the original image component 54A, to be received by the micromirror array 110A. Image component 54E passes through the ray-forming device 150 such that it is disposed along the same optical pathway as the image component 54A, to be received by the micromirror array 110B.

In some embodiments, the ray-forming device 150 includes both opaque surfaces and transparent surfaces, wherein the opaque surfaces reflect light, such that the ray-forming device is capable of refracting and reflecting incident light, as well as allowing the incident light to pass through the ray-forming device. One ray-forming device that may be used in the optical system 100 is described in FIG. 3, below.

At each micromirror array 110, the micromirrors 20 reflect the incoming image component 54, while the non-mirrored regions 30 absorb or disperse the image components. Image component 54C is reflected off the micromirror array 110A; image component 54D is reflected off the micromirror array 110B.

Since each micromirror array 110 includes an equal number of mirrored and non-mirrored surfaces, a fifty percent loss of image data may occur at the micromirror arrays, depending on application (or how applied). Put another way, image component 54C includes approximately half the image data that image component 54B contains. Likewise, image component 54D includes approximately half the image data that image component 54E contains.

Once reflected by the micromirror arrays 110A and 110B, the respective image components 54C and 54D are combined by the ray-forming device 150. Image component 54C passes through the ray-forming device 150, to produce image component 54F. Image component 54D is reflected by the ray-forming device 150 at a ninety-degree angle, to produce image component 54G. The image components 54F and 54G are combined to produce the composite image 130.

In some embodiments, the same ray-forming device 150 used to spatially separate the image component 54A into image components 54B and 54E may be used to combine the reflected image components 54C and 54D from the micromirrors 110A and 110B, respectively into the composite image 130. In other embodiments, the reflected image components 54C and 54D are transmitted or reflected along an alternate optical pathway, to be combined into the composite image 130.

In contrast to prior art micromirror arrays, the micromirror arrays 110 of the optical system 100 are incomplete reflective surfaces, having both reflective (micromirrors 20) and non-reflective (non-mirrored regions 30) surfaces. However, by combining them in the manner described in FIG. 1, the composite image 130 that is formed substantially represents the original image source 55.

Within each micromirror array 110, the micromirrors 20 may have different shapes, although these shapes do not extend beyond the region of a square micromirror, as shown.

Regular geometric shapes, such as circles, equilateral triangles, and hexagons, can replace the square micromirrors 20 in FIG. 1.

By separating the image source into separately controllable image components, the optical system 100 is able to overcome the fill factor problem of prior art micromirror arrays. Indeed, each micromirror array 110 of the optical system 100 has approximately half the micromirrors 20 of prior art micromirror arrays, for a fill factor of about 50%. By superimposing partial images from complementary micromirror arrays 110, a fill factor substantially close to 100% in the composite image 130, or a perfect fill factor, may be achieved.

The gap spacing of prior art micromirrors kept the images produced by the micromirrors from having a 100% fill factor. Since the micromirrors 20 of the microarrays 110 are arranged in a checkerboard pattern, with non-mirrored regions 30 disposed to the left, right, above, and below each micromirror (except at the edges), the micromirrors 20 of the micromirror arrays 110 have sufficient gap spacing to avoid electric short-circuiting.

Since a perfect or nearly perfect fill factor can be achieved, the image resolution of the optical system 100 can be improved by using relatively smaller micromirrors 20. When the size of the micromirrors 20 is lessened, the size of the non-mirrored regions 30 is also diminished. Thus, the size needed to house the control and support region of the micromirror arrays 110 may limit how small the micromirrors 20 may be. By making the micromirrors 20 smaller, an improvement in image quality can be made, however, without concern about the gap spacing.

Figure 2:
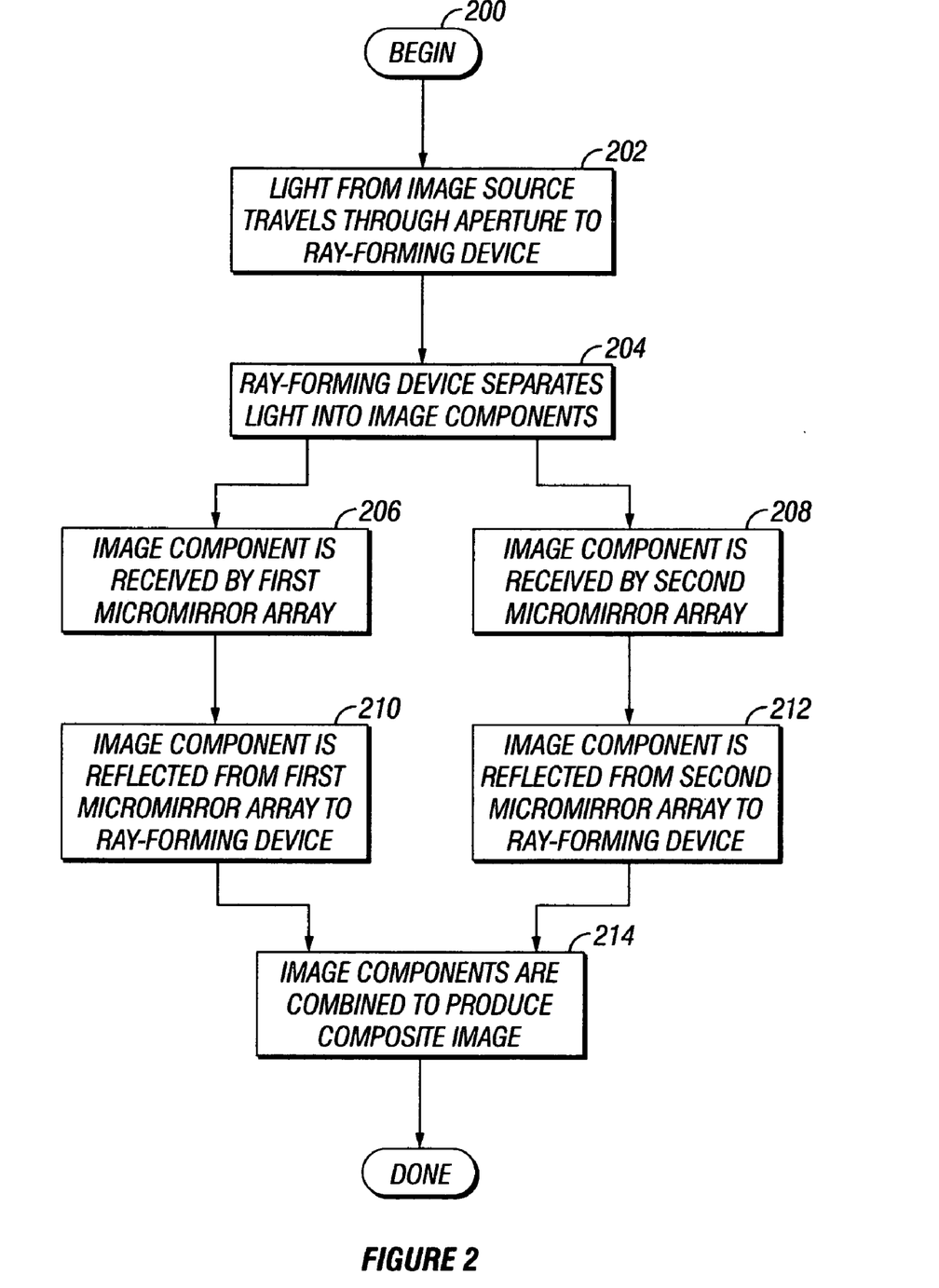
FIG. 2 is a flow diagram illustrating operation of the optical system of FIG. 1, according to some embodiments.

In FIG. 2, a flow diagram shows how the optical system 100 operates, according to some embodiments. Incoming image component 54A from the image source 55 travels through the aperture 52, to be received by the ray-forming device 150 (block 202). The ray-forming device 150 next separates the image component 54A into two image components 54B and 54E (block 204). The image component 54B is received by the micromirror array 110A (block 206). The image component 54E is received by the micromirror array 110B (block 208). In some embodiments, the operations of blocks 206 and 208 occur simultaneously while, in other embodiments, they are sequential.

Once the respective image components are received by the micromirror arrays, the checkerboard pattern of reflecting mirrors within each micromirror array produces more image components. From the micromirror array 110A, the image component 54C is reflected back toward the ray-forming device 150 (block 210). Likewise, the image component 54D is reflected toward the ray-forming device 150 from the micromirror array 110B (block 212). The image components 54C and 54D are combined, by sending the image component 54C through the ray-forming device (as image component 54F) and by deflecting the image component 54D at a ninety-degree angle (as image component 54G), to produce the composite image 130 (block 214). As shown by the "a," "b," "c," and "d" notations in FIG. 1, the composite image 130 includes the image data from both micromirror arrays 110, such that a complete image of the original image data 55 is produced. The operation of the optical system 100 is thus complete.

Figure 3:
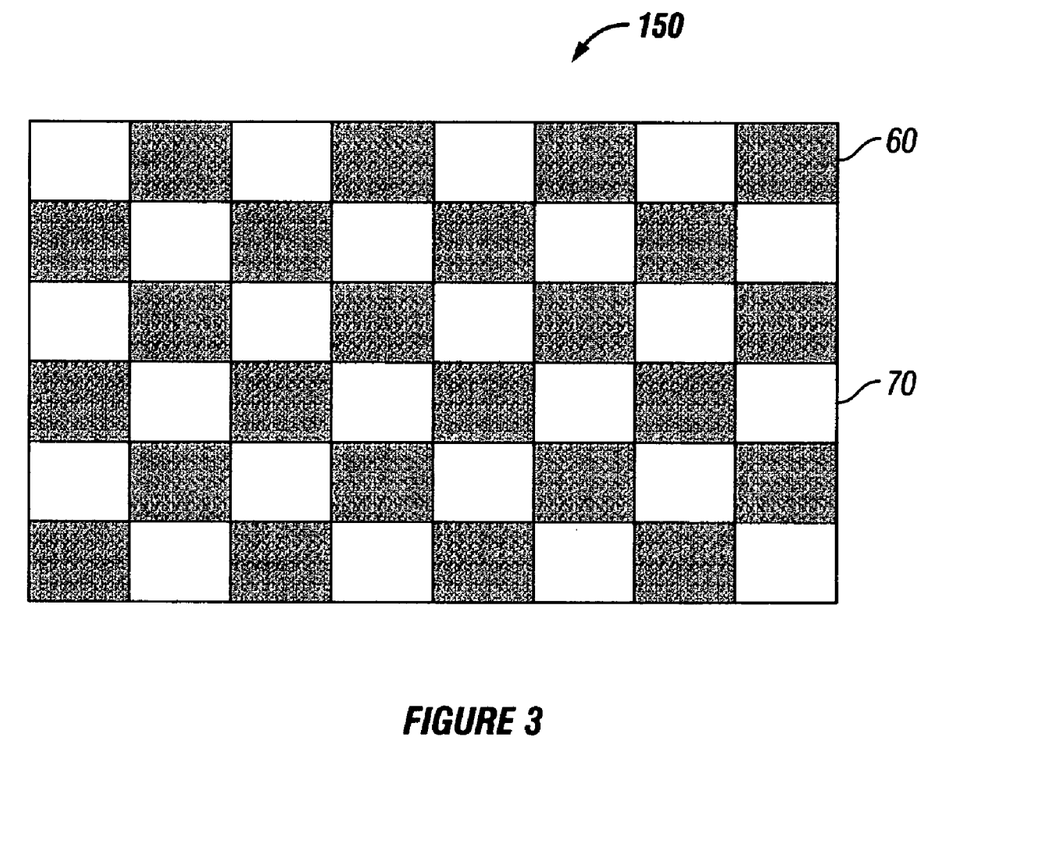
FIG. 3 is a side view of the active surface of the ray-forming device of FIG. 1, according to some embodiments.

In some embodiments, the ray-forming device 150 of FIG. 1 is a patterned beam splitter, including both opaque surfaces and transparent surfaces, which allow the various image components to reflect or deflect from or pass through the ray-forming device. In FIG. 3, for example, the ray-forming device 150 is a patterned beam splitter, a composite of opaque or reflective surfaces 60 and transparent surfaces 70, arranged in a checkerboard-like pattern. The opaque surfaces 60 will reflect from either side of the ray-forming device.

The patterned beam splitter 150 separates the incoming image component from the image source into two distinct image components. Thus, when image component 54A splits into image components 54B and 54E, the portion of the image component 54A that passes through the transparent surfaces 70 becomes image component 54E (received by the micromirror array 110B) while the portion of the image component 54A that reflects off the opaque surfaces 60 becomes image component 54B (received by the micromirror array 110A).

The opaque surfaces 60 of the patterned beam splitter 150, which are reflective, may be made using metallic lamina, like metallic foil, silver foil, or other reflective materials. Both the opaque surfaces 60 and the transparent surfaces 70 of the patterned beam splitter 150 are identical in size and shape.

In some embodiments, the patterned beam splitter 150 is oriented at an angle that is forty-five degrees relative to the image component 54A. The checkerboard arrangement of the opaque surfaces 60 in the patterned beam splitter 150 separates the image component 54A into pixel-sized portions. The opaque surfaces 60 are sized such that image components that are the same size as the micromirrors 20 are generated.

Because the patterned beam splitter 150 is disposed at the forty-five degree angle, the opaque surfaces 60 and the transparent surfaces 70 are rectangular in shape, assuming that the micromirrors 20 of each micromirror array 110 is square-shaped. Thus, for a square micromirror 20 of dimensions N×N, the dimensions of the opaque surfaces 60 and the transparent surfaces 70 are N×N$\sqrt{2}$, when the patterned beam splitter is oriented at a forty-five degree angle.

Figure 4A:
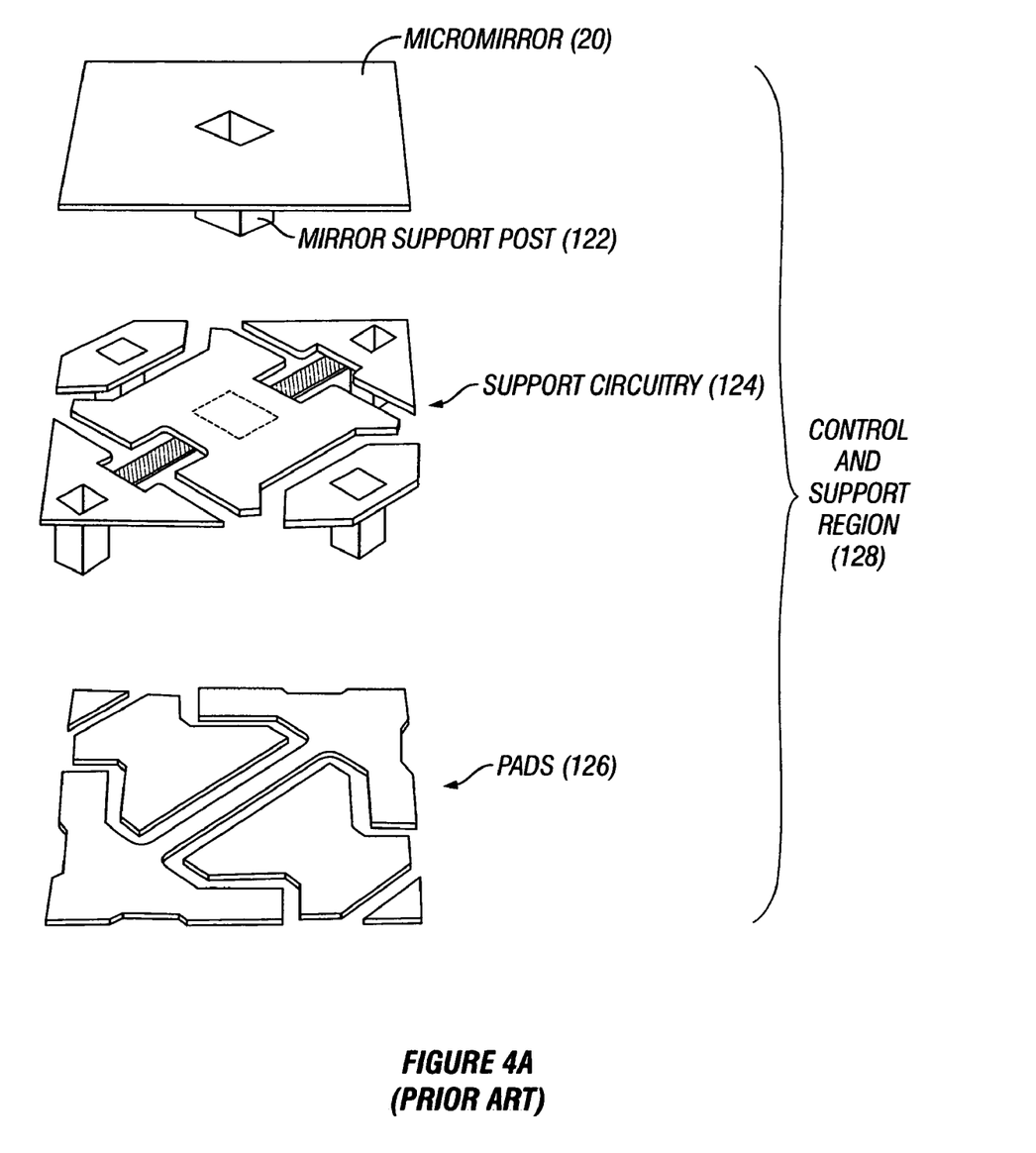
FIG. 4A is a perspective view of a micromirror, including its underlying control and support region, according to the prior art.

In addition to improving the fill factor of prior art micromirror arrays, the optical system 100 further provides an alternative location for the control and support region of each micromirror. FIG. 4A is a perspective view of a typical micromirror device. The entire region beneath the micromirror 20 is known herein as the control and support region 128. The control and support region 128 is made up of a mirror support post 122, support circuitry 124, and pads 126.

The micromirror 20 is disposed upon support circuitry 124 by a mirror support post 122. The support circuitry 124 includes various components, which enable the micromirror to actuate and de-actuate, including landing tips, torsion hinges, yokes, and address electrodes. Beneath the support circuitry 124 and typically embedded within the substrate of the micromirror array are pads 124, usually composed of metal. Both the support circuitry 124 and the pads 126, like the micromirrors themselves, are very, very small in size. The images of FIG. 4A are merely representative of support circuitry that may be used in a micromirror device, and may vary considerably in actual layout and configuration from what is depicted in the figures.

The various components of the micromirror array are typically fabricated in layers, with the layers closest to the substrate being fabricated first. These layers add somewhat to the overall height of the micromirrors 20 in the micromirror array. In some embodiments, the control and support region 128 for each micromirror 20, rather than being disposed beneath each micromirror 20, is disposed in the location of the non-mirrored regions 30. Since each micromirror array 110 is composed of an equal number of micromirrors 20 and non-mirrored regions 30, a non-mirrored region 30 is available for each micromirror 20 for this purpose.

Figure 4B:
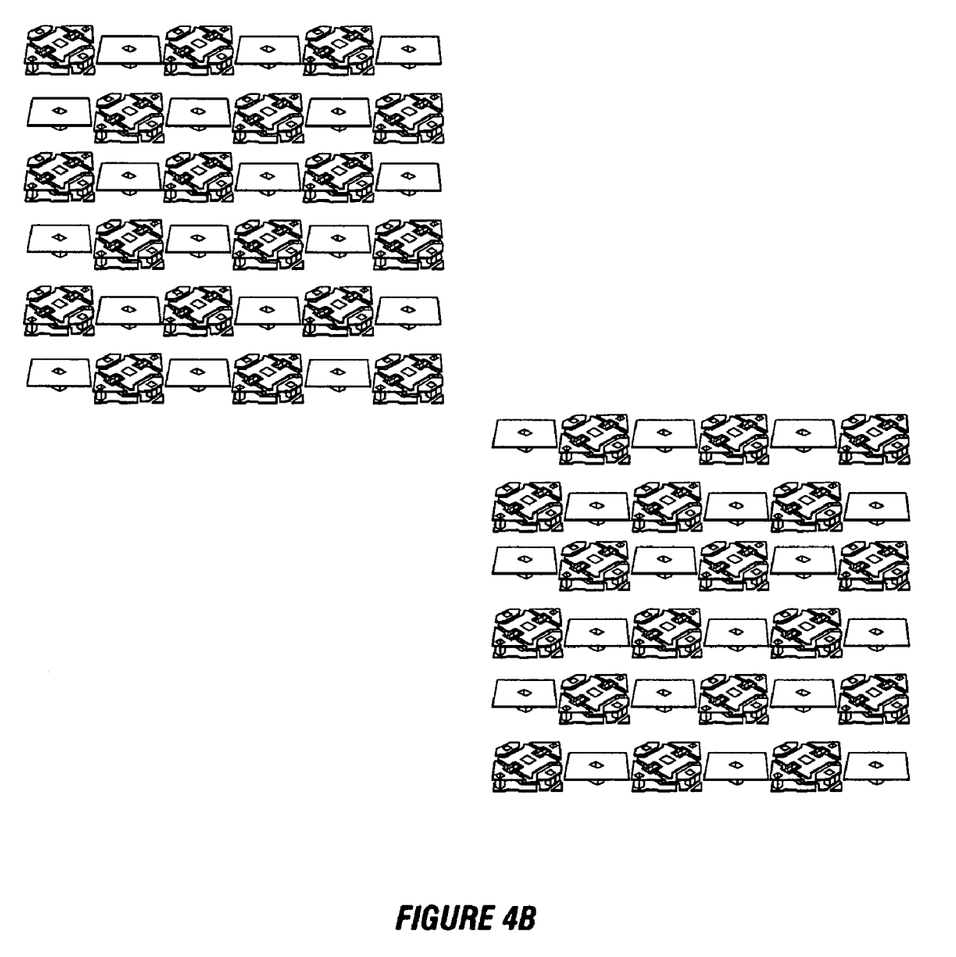
FIG. 4B is a perspective view of the micromirror array of FIG. 1, in which the control and support region of a micromirror is positioned in an adjacent non-mirrored region, according to some embodiments.

By placing the control and support region 128 of each micromirror adjacent to, rather than beneath, each micromirror 20, the manufacture of the micromirror arrays 110 may be less complex. While the components of the control and support region 128 may not change significantly in size (since the non-mirrored regions 30 are substantially similar in size to the micromirrors 20), the cost of manufacturing the micromirror arrays 110 is likely to be significantly reduced, since the number of layers of the micromirror array is diminished.

This alternative arrangement is depicted in FIG. 4B, according to some embodiments. In the micromirror array 110 (comprising arrays 110A and 110B), a portion of the control and support region 128, the support circuitry 124 and the pads 126, is positioned, not beneath the micromirror 20, but inside an adjacent non-mirrored region 30. Only the mirror support post 122 remains in the micromirror region 20. Since the non-mirrored region 30 is not reflecting image date, the non-mirrored regions 30 may be coated with anti-reflective material.

While the optical system 100 includes two complementary micromirror arrays 110, the principles of FIG. 1 can be extended to include additional micromirror devices and additional image components. An optical system including four micromirror arrays, each processing twenty-five percent of the image, for example, may produce results similar to the optical system 100.

Alternatively, multiple micromirror arrays can be used to produce redundant partial copies of the image, which may then be digitally controlled for a number of applications. As one example, an image may be digitally controlled by detecting the multiple copies of the reflected image components from the multiple micromirror arrays, analyzing the data with image processing software, and signaling the micromirrors to turn "on" or "off." In this manner, the displayed or projected composite image may be controlled by filtering the intermediary image components.

As an alternative to micromirror arrays, the optical system 100 may employ complementary arrays of microshutters. Like the micromirror arrays, the microshutters both reflect and recombine portions of the image components from the image source, to produce a composite image suitable for projection or display. The optical system 100 may further include other elements, to filter, control, focus, modify, or direct the incident light from the image source 55.

Figure 5:
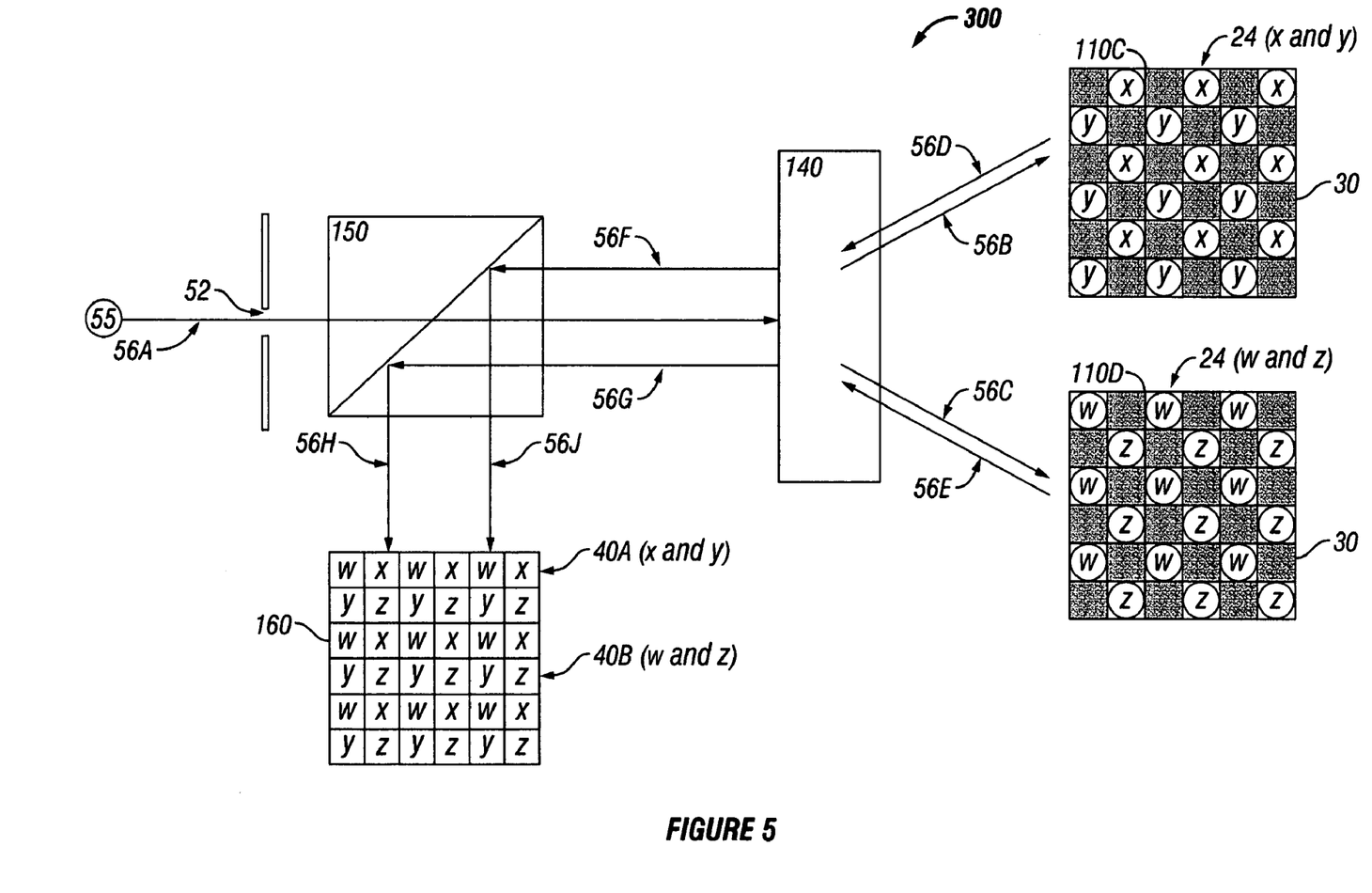
FIG. 5 is a top view of an optical system employing a ray-forming device, a birefringent crystal, and two complementary micromirror arrays with circular micromirrors, according to some embodiments.

In FIG. 5, another optical system 300 is depicted, according to some embodiments. The optical system 300 includes a ray-forming device 150, a birefringent crystal 140, and two complementary micromirror arrays (110C and 110D) (collectively, micromirror arrays 110), which operate to produce composite image 160. Image components 56A, 56B, 56C, 56D, 56E, 56F, 56G, 56H, and 563 (collectively, image components 56) follow an optical pathway from an image source 55, through the optical system 300, to produce a composite image 160 that is representative of the image source. The ray-forming device 150 of FIG. 5 may be a simple beam splitter.

The complementary micromirror arrays (110C and 110D) are similar to the micromirror arrays of FIG. 1, but feature circularly-shaped micromirrors 24 instead of square-shaped micromirrors 20. The circularly-shaped micromirrors 24 can be made larger than the square-shaped micromirrors to accept square-shaped image components 56.

The birefringent crystal 140 is a refractive optic capable of separating light into two polarized image components. Polarized light has light waves oriented in one direction.

From the image source 55, image component 56A passes through the aperture 52, then through the ray-forming device 150, to be received by the birefringent crystal 140. The birefringent crystal 140 separates the image component 56A into two polarized image components 56B and 56C. Image component 56B is received by the micromirror array 110C while image component 56C is received by the micromirror array 110D.

The image component 56B is oriented at ninety degrees relative to the image component 56C. The micromirror arrays 110C and 110D are positioned so as to receive their respective image components 56B and 56C. As with the optical system 100 (FIG. 1), the micromirror arrays 110C and 110D of FIG. 5 have alternating surfaces of circular micromirrors 24 and non-mirrored surfaces 30.

The portion of the image component 56B that makes contact with the circular micromirrors 24 is reflected back, as image component 56D, to the birefringent crystal 140. The portion of the image component 56B that makes contact with the non-mirrored region 30 is not processed, but is absorbed. Similar results occur with the image component 56C and the micromirror array 110D, producing image component 56E, to be received by the birefringent crystal 140. Both the image components 56D and 56E are polarized.

The image components 56D and 56E are depolarized upon passing through the birefringent crystal 140 the second time around, to produce image components 56F and 56G. Image components 56F and 56G are deflected off the ray-forming device 150 and combined as image components 56H and 56J, to produce the composite image 160.

As in FIG. 1, the face of each image component 40 of the composite image 160 of FIG. 5 denotes the source of the image component. Image components 40A ("x" and "y") are produced by the micromirror array 110C while image components 40B ("w" and "z") are produced by the micromirror array 110D.

Figure 6:
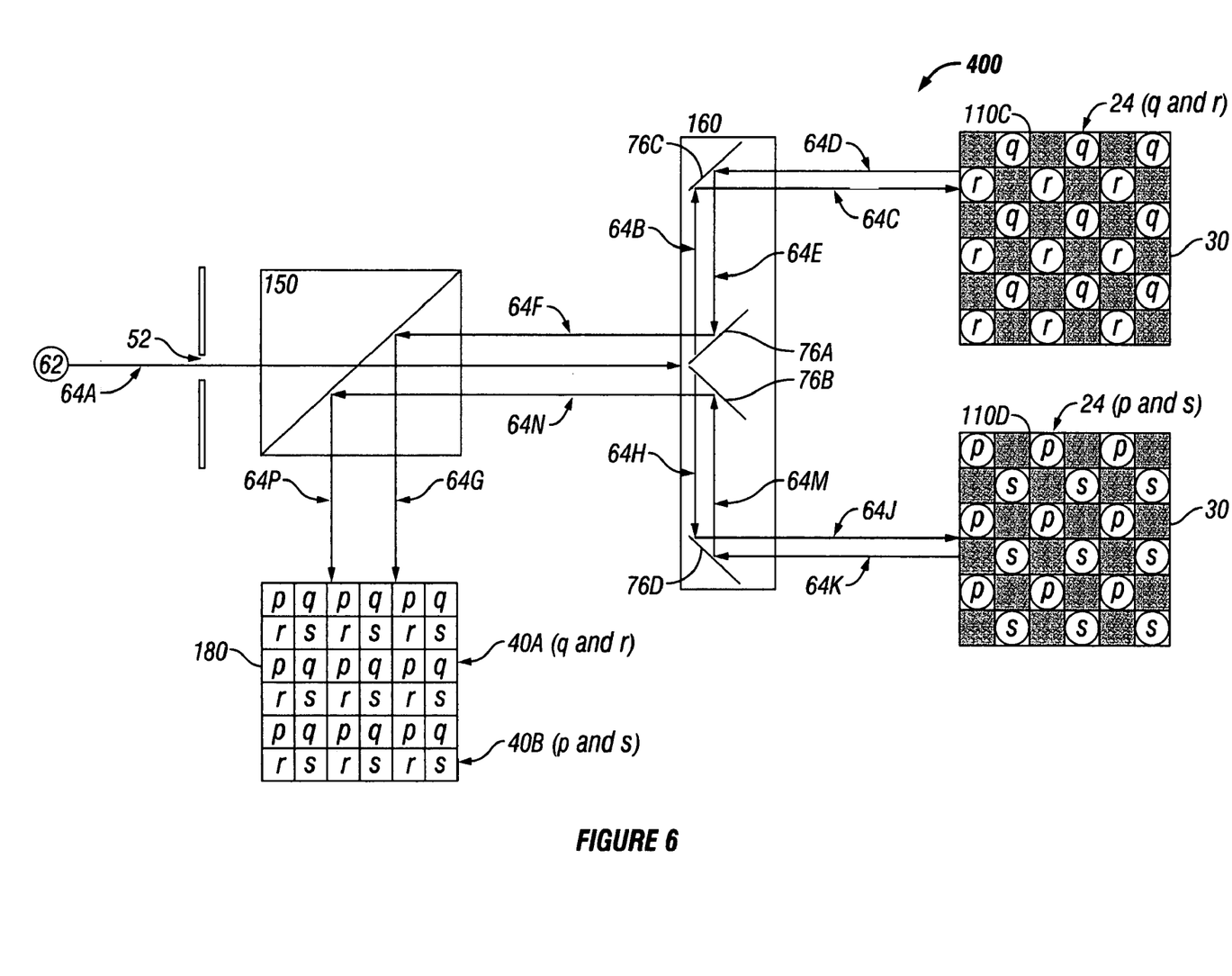
FIG. 6 is a top view of an optical system employing a ray-forming device, a system of mirrors, and two complementary micromirror arrays with circular micromirrors, according to some embodiments.

In FIG. 6, an optical system 400 includes a ray-forming device 150, a system of mirrors 160, and two complementary micromirror arrays (110C and 110D). The optical system 400 is similar to the optical system 300, as it includes the same two complementary micromirror arrays 110C and 110D, with circularly shaped micromirrors 24. Image components 64A, 64B, 64C, 64D, 64E, 64F, 64G, 64H, 64J, 64M, 64N, and 64P (collectively, image components 64) follow an optical pathway from an image source 62, through the optical system 400, to produce a composite image 180 that is representative of the image source.

An image component 64A, coming from the image source 62, passes through the aperture 52, then through the ray-forming device 150. The ray-forming device 150 and the system of mirrors 160 separate the image component 64A into multiple image components, then recombine the image components, to produce the composite image 180.

The system of mirrors 160 includes mirror 76A, 76B, 76C, and 76D, positioned as shown in FIG. 6, so as to reflect towards other mirrors or the micromirror arrays 110. First, the image component 64A passes through the ray-forming device 150 and is received into the system of mirrors 160, where part of the image component is reflected off the mirror 76A and is split into image component 64B. A second part of the image component 64A is reflected off the mirror 76B and is split into image component 64H.

Image component 64B is reflected by mirror 76C, where it is deflected toward the micromirror array 110C as image component 64C. Similarly, image component 64H is reflected by mirror 76D, where it is deflected toward the micromirror array 110D as image component 64J. The micromirror arrays 110C and 110D, having alternately disposed micromirrors 24 and non-mirrored regions 30, reflect some image component back toward the system of mirrors 160.

Image component 64D, coming from the micromirror array 110C, is reflected off the mirror 76C as image component 64E, then reflected off the mirror 76A as image component 64F, then reflected off the ray-forming device as image component 64G, to make up part of the composite image 180. Similarly, image component 64K, coming from the micromirror array 110D, is reflected off the mirror 76D as image component 64M, then reflected off the mirror 76B as image component 64N, then reflected off the ray-forming device as image component 64P, to make up the other part of the composite image 180.

As in FIGS. 1 and 5, the face of each image component 40 of the composite image 180 of FIG. 6 denotes the source of the image component. Image components 40A ("q" and "r") are produced by the micromirror array 110C while image components 40B ("p" and "s") are produced by the micromirror array 110D.

The system of mirrors 160 may include many mirrors, arranged in many different configurations. As an alternative to the system of mirrors, a system of optics may be used. The depiction in FIG. 6 is to illustrate one possible configuration for the system of mirrors 160.

The optical systems 100, 300, and 400 represent three of several possible configurations for achieving a high fill factor in a micromirror display or projection system. Different combinations of ray-forming devices, micromirror arrays, birefringent crystals, and systems of mirrors or systems of optics, other than those shown, above, may be employed to achieve similar results.

By splitting the incoming light from an image source into image components, the components can be processed and recombined to achieve a high fill factor. By using micromirror arrays in which micromirrors need not be closely positioned relative to one another, the gap spacing issue of prior art micromirror arrays is avoided. By disposing the micromirrors in a checkerboard arrangement, it is possible to move the control and support structure of each micromirror next to, rather than beneath, each micromirror, making the production of the micromirror array less costly, in some embodiments.

While the invention has been described with respect to a limited number of embodiments, those skilled in the art will appreciate the interchangeable components and the numerous modifications and variations therefrom. It is intended that the appended claims cover all such modifications and variations as fall within the true spirit and scope of the invention.

I claim:

1. An optical system, comprising:
a first micromirror array, comprising micromirrors and non-mirrored regions, wherein the micromirrors and the non-mirrored regions of the first micromirror array are alternately disposed in a checkerboard-like arrangement;
a second micromirror array, comprising micromirrors and non-mirrored regions, wherein the micromirrors and the non-mirrored regions of the second micromirror array are alternately disposed in a checkerboard-like arrangement and the second micromirror array is complementary to the first micromirror array; and
a ray-forming device, wherein the ray-forming device separates a light image into image components, wherein a first image component is received by the first micromirror array, a second image component is received by the second micromirror array, a third image component sent from the first micromirror array and a fourth image component sent from the second micromirror array are combined at the ray-forming device to produce a composite image with a perfect or nearly perfect fill factor.

2. The optical system of claim 1, wherein the ray-forming device is a beam splitter.

3. The optical system of claim 1, wherein each micromirror further comprising a control and support region comprising at least a mirror support post, support circuitry, and pads, wherein the mirror support post is disposed beneath the micromirror, and the support circuitry and pads are disposed not beneath the micromorror, but beneath a non-mirrored region adjacent to the micromirror.

4. The optical system of claim 1, wherein the micromirrors are square in shape.

5. The optical system of claim 1, wherein the micromirrors are circular in shape.

6. The optical system of claim 1, wherein the ray-forming device further comprises transparent surfaces and reflective surfaces, in which the transparent surfaces are alternately disposed adjacent to the reflective surfaces in a checkerboard-like arrangement.

7. The optical system of claim 1, wherein the composite image is displayed.

8. The optical system of claim 1, wherein the composite image is projected.

9. The optical system of claim 1, further comprising a birefringent crystal, wherein the first image component and the second image component are produced by the birefringent crystal.

10. The optical system of claim 1, further comprising a system of mirrors, wherein the first image component and the second image component are produced by the system of mirrors.

11. An optical system, comprising:
a first microshutter array, comprising transparent and opaque regions;
a second microshutter array, comprising transparent and opaque regions; and
a ray-forming device, wherein the ray-forming device separates a light image into image components, wherein a first image component is received by the first microshutter array, a second image component is received by the second microshutter array, a third image component sent from the first microshutter array and a fourth image component sent from the second microshutter array are combined at the ray-forming device to produce a composite image with a fill factor of one hundred or nearly one hundred percent.

12. The optical system of claim 11, wherein the ray-forming device is a beam splitter.

13. The optical system of claim 11, wherein the transparent and the opaque regions of the first microshutter array are alternately disposed in a checkerboard-like arrangement.

14. The optical system of claim 13, wherein the transparent and the opaque regions of the second microshutter array are alternately disposed in a checkerboard-like arrangement and the second microshutter array is complementary to the first microshutter array.

15. A method, comprising:
receiving a light image into a ray-forming device;

separating the light image into first and second image components by the ray-forming device;

receiving the first image component by a first micromirror array, the first micromirror array comprising alternately disposed micromirrors and non-micromirrors, wherein the first image component is reflected off the micromirrors to produce a third image component;

receiving the second image component by a second micromirror array, the second micromirror array comprising alternately disposed second micromirrors and second non-micromirrors, the arrangement of second micromirrors and second non-micromirrors being complementary to the arrangement of micromirrors and non-micromirrors, wherein the second image component is reflected off the second micromirrors to produce a fourth image component; and combining the third and fourth image components together as a composite image, wherein the composite image has a substantially perfect fill factor.

16. The method of claim 15, further comprising: projecting the composite image.

17. The method of claim 15, further comprising: displaying the composite image.

18. A micromirror array, comprising:

a non-mirrored surface, one of a plurality of non-mirrored surfaces;

a micromirror, wherein the micromirror is part of a plurality of micromirrors which are alternately disposed with the plurality of non-mirrored surfaces in a checkerboard-like pattern, the micromirror being associated with the non-mirrored surface; and a control and support region, one of a plurality of control and support regions, one for each of the plurality of micromirrors, wherein each control and support region comprising a micromirror support post, support circuitry, and pads;

wherein the micromirror support post is disposed beneath the micromirror while the support circuitry and the pads are not disposed beneath the micromirror, but are instead disposed beneath the associated non-mirrored surface.

19. The micromirror array of claim 18, wherein the micromirror is square in shape.

20. The micromirror array of claim 18, wherein the micromirror is circular in shape.

* * * * *